No. 744,510. Patented November 17, 1903.

UNITED STATES PATENT OFFICE.

EUGENE DONARD AND HENRI LABBÉ, OF PARIS, FRANCE.

PROCESS OF MAKING ALBUMINOID SUBSTANCES FROM MAIZE.

SPECIFICATION forming part of Letters Patent No. 744,510, dated November 17, 1903.

Application filed April 1, 1903. Serial No. 150,654. (No specimens.)

*To all whom it may concern:*

Be it known that we, EUGENE DONARD and HENRI LABBÉ, both citizens of the Republic of France, and residents of Paris, France, have invented certain new and useful Improvements in the Manufacture of Albuminoid Substances from Maize, of which the following is a specification.

This invention relates to a new product from maize and a method of producing and recovering same; and it consists, essentially, in first removing from the material—that is, maize, the residues of maize, starch-factory residues, and the like—all of the fatty or oily constituents, then extracting the maizine from the material and also extracting another alimentary albuminoid constituent, which latter is not soluble in the agent employed for dissolving out the maizine. These mixed albuminoids are precipitated with water and dried. We have found that the maizine extracted from the maize material after the removal of the oily or fatty substances from the latter is much purer and has a better appearance than that obtained without the removal of said fatty substances, and we have also found that when the maizine is extracted with the aid of amyl alcohol or other higher alcohol the residue will still contain another albuminoid substance which is insoluble in amyl alcohol, but soluble, as is also maizine, in ethyl and methyl alcohols. Therefore by means of the process following we may obtain a mixture of these two albuminoid products.

The raw material—as, for example, the residue from starch factories—is first dried and then deprived of oil and fatty substances by diffusion in benzin, ether, or other suitable solvent. It is then treated or digested with the aid of a suitable apparatus with strong ethyl alcohol, either pure or mixed with methyl alcohol and acetone or with methyl alcohol alone without either ethyl alcohol or acetone. The resulting solution is suitably concentrated—say ten to twenty per cent.—and the hydrates of the proteids are precipitated in the solution by a suitable liquid, such as water, which may or may not contain sea-salt. The action of the water is allowed to continue for some hours, so as to complete the precipitation if this is not effected at once. At the termination of the precipitation the spongy mass obtained separates, the liquid is decanted, and the precipitate dried. This latter step may be conveniently effected by first submitting the mass to centrifugal action and then drying it in a stove or kiln. The drying should be effected at a low temperature. The albuminoid compound thus produced is insoluble in pure water or in water containing a small quantity of alcohol and forms a commercial alimentary product of great value.

The following detailed process is the one preferred: One hundred kilograms of maize is is steeped for eight (8) consecutive hours in a suitable vessel containing about two (2) hectoliters of crystallizable benzin or some other light petroleum ether. The complete removal of the fatty matter of the maize having been thus effected, the volatile solvent remaining in the maize is removed by passing through the latter superheated steam. The material is then submitted to steeping for about six (6) consecutive hours in about three (3) hectoliters of ninety per cent. ethyl alcohol at the boiling temperature of this solvent. The solution of pure maizine thus obtained is precipitated by six (6) volumes of water to which sea-salt may or may not be added. By reason of the absence of the fats the water precipitates the maizine in a spongy and extremely-divided state. This product is now dried at a temperature of 25° centigrade in a current of dry air. Thus is obtained a pure albuminoid substance which may be crushed in a mortar in order to reduce it to the condition of farina. The yield of maizine will be about six (6) kilograms. If the residues from the starch factories are employed, the operation is exactly the same in principle; but this residual matter being richer in maizine than the maize itself the yield will be about ten (10) kilograms, or ten per cent. instead of six per cent. The proportions of the solvents and precipitants, the duration and temperature of the heating, and the apparatus employed will be precisely the same as where maize is treated. The product thus produced is a farinaceous powder of a yellowish-white color, insoluble in pure water, but soluble in the digestive fluids and in alkaline solutions and also in fatty substances. It contains about 15.5 per cent. of nitrogen.

Having thus described our invention, we claim—

1. The herein-described method of simultaneously separating maizine and another analogous albuminoid substance from maize material, which consists in first removing the fatty matter from the raw material, then digesting said material in an alcohol which will dissolve both of the albuminoids, then precipitating the combined albuminoid substances with water, and then drying the precipitant.

2. The herein-described method of simultaneously separating maizine and another analogous albuminoid substance from maize material, which consists in first drying the material, then treating it with a volatile solvent for the fatty substances contained whereby the same are eliminated, then digesting the material in strong ethyl alcohol to dissolve the albuminoids, then precipitating the mixture of albuminoids with water, and then drying the precipitate.

In witness whereof we have hereunto signed our names in the presence of two subscribing witnesses.

EUGENE DONARD.
HENRI LABBÉ.

Witnesses:
ARMENGAUD, Jeune,
MARCEL ARMENGAUD, Jeune.